United States Patent
Schranz et al.

(10) Patent No.: US 10,824,131 B2
(45) Date of Patent: Nov. 3, 2020

(54) KINEMATIC CALIBRATION

(71) Applicant: Mikron Agie Charmilles AG, Nidau (CH)

(72) Inventors: David Schranz, Ipsach (CH); Jean-Philippe Besuchet, Neuchatel (CH)

(73) Assignee: GF Machining Solutions AG (CH)

(*) Notice: Subject to any disclaimer, the term of this patent is extended or adjusted under 35 U.S.C. 154(b) by 257 days.

(21) Appl. No.: 15/823,853

(22) Filed: Nov. 28, 2017

(65) Prior Publication Data

US 2018/0150049 A1 May 31, 2018

(30) Foreign Application Priority Data

Nov. 29, 2016 (EP) ..................... 16201064

(51) Int. Cl.
| | | |
|---|---|---|
| *G05B 19/401* | (2006.01) | |
| *G05B 19/19* | (2006.01) | |
| *G01B 21/04* | (2006.01) | |
| *G01B 5/008* | (2006.01) | |

(52) U.S. Cl.
CPC .......... *G05B 19/401* (2013.01); *G01B 5/008* (2013.01); *G01B 21/042* (2013.01); *G05B 19/19* (2013.01); *G05B 2219/37001* (2013.01); *G05B 2219/37241* (2013.01); *G05B 2219/37422* (2013.01);
(Continued)

(58) Field of Classification Search
CPC .................. G05B 19/401; G05B 19/19; G05B 2219/50139; G01B 21/042; G01B 5/008
See application file for complete search history.

(56) References Cited

U.S. PATENT DOCUMENTS

| | | | |
|---|---|---|---|
| 6,668,466 B1 * | 12/2003 | Bieg ...................... | G01B 5/008 33/1 PT |
| 8,700,203 B2 | 4/2014 | Haase et al. | |
| 8,786,243 B2 | 7/2014 | Mori et al. | |

(Continued)

FOREIGN PATENT DOCUMENTS

| | | |
|---|---|---|
| DE | 102006038064 A1 | 2/2008 |
| DE | 102010038783 A1 | 2/2011 |

(Continued)

OTHER PUBLICATIONS

Extended European Search Report dated May 18, 2017 regarding EP Application No. 16201064.9 (8 pages).

(Continued)

*Primary Examiner* — Regis J Betsch
*Assistant Examiner* — Jeremy A Delozier
(74) *Attorney, Agent, or Firm* — Harness, Dickey & Pierce, P.L.C.

(57) ABSTRACT

A calibration method for numerical controlled machine tools (1), which uses a kinematic model to generate a compensation model for the positioning error occurring with the movement of the linear (X, Y, Z) and rotation axes (B, C, A) of a machine tool (1). The calibration method measures the positions of a calibration ball (6) with a measurement sequence which includes the combined movement of the calibration ball (6) around two rotation axes (C, B or C, A), wherein the measurements around a first rotation axis (C) include at least two rotational position movements around a second axis (B or A).

10 Claims, 6 Drawing Sheets

(52) U.S. Cl.
CPC .............. *G05B 2219/49344* (2013.01); *G05B 2219/50139* (2013.01)

(56) References Cited

U.S. PATENT DOCUMENTS

| | | |
|---|---|---|
| 2008/0114485 A1 | 5/2008 | Katoh et al. |
| 2009/0028286 A1* | 1/2009 | Prestidge ............... G01B 5/008 377/15 |
| 2010/0101104 A1* | 4/2010 | Grzesiak ............. G01B 21/042 33/502 |
| 2013/0139660 A1* | 6/2013 | Maxted ................ G05B 19/401 82/1.11 |
| 2013/0253871 A1* | 9/2013 | Gray ..................... B23Q 17/22 702/95 |
| 2015/0160049 A1 | 6/2015 | Oki |
| 2015/0177727 A1 | 6/2015 | Shimizu |

FOREIGN PATENT DOCUMENTS

| | | |
|---|---|---|
| DE | 102014018518 A1 | 6/2015 |
| DE | 102015221001 A1 | 4/2016 |
| EP | 1914612 B1 | 4/2008 |

OTHER PUBLICATIONS

U.S. Appl. No. 14/629,964, filed Feb. 24, 2015, Jean-Phillippe Besuchet, et al.

U.S. Appl. No. 15/270,334, filed Sep. 20, 2016, Jean-Phillippe Besuchet, et al.

\* cited by examiner

| Pos. | Rotation axes position | | Linear axes positions | | |
|---|---|---|---|---|---|
| | C | B | X | Y | Z |
| 1 | $C_{1,1}$ | $B_1$ | $X_1$ | $Y_1$ | $Z_1$ |
| 2 | $C_{2,1}$ | $B_1$ | $X_2$ | $Y_2$ | $Z_2$ |
| 3 | $C_{3,1}$ | $B_1$ | $X_3$ | $Y_3$ | $Z_3$ |
| 4 | $C_{4,1}$ | $B_1$ | $X_4$ | $Y_4$ | $Z_4$ |
| 5 | $C_{1,2}$ | $B_2$ | $X_5$ | $Y_5$ | $Z_5$ |
| 6 | $C_{2,2}$ | $B_2$ | $X_6$ | $Y_6$ | $Z_6$ |
| 7 | $C_{3,2}$ | $B_2$ | $X_7$ | $Y_7$ | $Z_7$ |
| 8 | $C_{1,3}$ | $B_3$ | $X_8$ | $Y_8$ | $Z_8$ |
| 9 | $C_{2,3}$ | $B_3$ | $X_9$ | $Y_9$ | $Z_9$ |
| 10 | $C_{3,3}$ | $B_3$ | $X_{10}$ | $Y_{10}$ | $Z_{10}$ |
| 11 | $C_{4,3}$ | $B_3$ | $X_{11}$ | $Y_{11}$ | $Z_{11}$ |
| ... | ... | ... | ... | ... | ... |
| k | $C_{n,3}$ | $B_3$ | $X_k$ | $Y_k$ | $Z_k$ |
| k+1 | $C_{1,4}$ | $B_4$ | $X_{k+1}$ | $Y_{k+1}$ | $Z_{k+1}$ |
| ... | ... | ... | ... | ... | ... |
| N | $C_{n,m}$ | $B_m$ | $X_N$ | $Y_N$ | $Z_N$ |

Figure 6

KINEMATIC CALIBRATION

CROSS-REFERENCE TO RELATED APPLICATION

This application claims the benefit and priority of EP 16 201 064.9, filed Nov. 29, 2016. The entire disclosure of the above application is incorporated herein by reference.

FIELD

The present invention relates to a calibration method for numerical controlled machine tools, which uses a kinematic model to generate a compensation model for the positioning error occurring with the movement of the linear and rotation axes of a machine tool.

BACKGROUND

Calibration methods measuring positioning errors and deducting compensation models to compensate the positioning errors occurring with the movement of the machine table or machine head of a machine tool are generally known. Multi-axis machine tools like milling, laser, grinding machines, electrical discharge machining or turning lathes have several degrees of freedom to move the working table and the machine head (machine spindle) relatively to each other.

Figure 1:
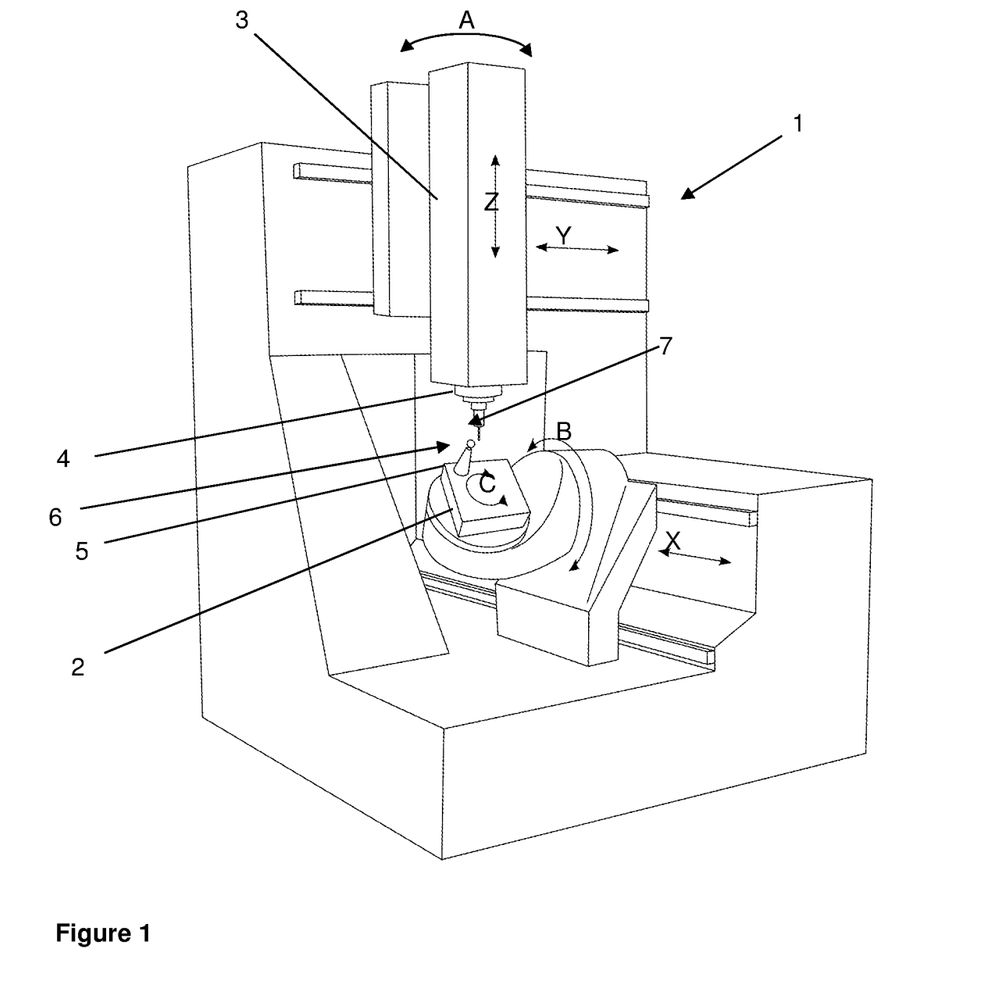
FIG. 1 Shows a typical multi-axis machine tool with 3 linear and two rotational degrees of freedom FIG. 2 Shows the working table of FIG. 1 with clamped jig and calibration ball FIGS. 3 to 6 Show the steps of the inventive calibration method will be described based on an example.

The available degrees of freedom on the multi-axis machine tool allow and facilitate the machining of workpieces. In particular, complex machining operations of a workpiece can be conducted on the same machine tool and in one machining process, without the need to change the workpiece position on the working table of the machine tool. Frequently, modern machine tools offer 3 linear. translational movements in the X, Y and Z directions of the machine tool and often one or two rotational movements. FIG. 1 shows a typical multi-axis machine tool with 3 linear and two rotational degrees of freedom. Despite the high accuracy of modern multi-axis machine tools, geometric positioning errors due to the linear or rotational movements of the working table or machine head cannot be avoided.

It is known to calibrate a multi-axis machine tool such that the occurring positioning errors caused by the movement of a machine axis is identified by the machine control system and compensated during the positioning of the working table or of the machine spindle. By the application of such a calibration and compensation method, the positioning accuracy of the machine tool is improved. Measuring and analyzing methods to derive the kinematic errors (for example the so called R-Test, see document [1]) already exist, however such systems involve specific measurement systems that are not suitable for field applications, since they are too time consuming or too expensive in their application.

Several machine controller manufacturers offer solutions for the kinematic calibration of machine tools with rotating and linear axes using touch probe measuring systems (for example the touch probe cycle 451 of Heidenhain [2]). The offered solutions consider however only optimizations based on one rotation axis at a time, which however limits the calibration quality for multi-axis machine tools.

The documents DE-102015221001-A1 and DE-102010038783-A1 disclose a geometric error identification and compensation system. Such systems however might be in some cases less accurate because the kinematic errors are determined based on subsets of positioning errors, i.e., the kinematic errors related to one rotation axis are determined based on measurements made by varying the position of this rotation axis and maintaining the other rotation axis in one position, then repeating the procedure for the other rotation axis.

The publication EP-1914612-B1 discloses a kinematic model using a kinematic table to compensate positioning errors. For a machine axis having an error in a direction other than the respective axial direction, error transformation amounts dependent on the axial position are entered into the kinematic table. A numerical control converts set point positions of a tool, predefined for instance in workpiece coordinates, into set point positions of machine axes based on a kinematic chain defined by a kinematic table.

The US-2015-0177727-A1 and DE-102014018518-A1 disclose a numerical controller provided with the function of correcting displacement errors caused by machine movements. According to these documents, a measuring grid around workpiece area is defined, the grid is measured for different rotation axis positions and a correction map is determined for different linear and rotation axis positions.

The document US-2015-0160049-A1 discloses a further geometric error identification method for a multi-axis machine tool. The cited method includes a measuring step of indexing a position of a target ball mounted on a working table from a plurality of angles around a rotation axis, rotating the target ball around that rotation axis by a certain amount and re-measuring the position of that target ball at the respective indexed positions by using a touch probe mounted on the main spindle. The method includes a geometric error calculation step of calculating a geometric error from the measured position of the target ball. An ellipse-expression is derived from the measured positioning errors of the target ball and a positioning error correcting step is calculated to correct the position on the translation axes (x, y and z) for compensating the positioning error caused by one rotation axis.

The document U.S. Pat. No. 8,786,243-B2 describes a method for determining an error map for numerically controlled machine tools. Measurement points are defined and their positions are measured at different rotation axis positions, deducting therefrom the positioning errors caused by the rotation of those measurement points. A multidimensional correction table for the positioning error is generated based on these measurements.

SUMMARY

An aspect of the present invention is consequently to propose a calibration method which generates an improved compensation model for a numerical controlled machine tool. The calibration method to be proposed shall also be based on measurement means affordable and convenient in typical industrial environments.

The proposed calibration procedure is based on the measurement of a calibration ball particularly the calibration ball's center at different rotating axes positions. The different positions of the calibration ball are produced by activating the rotating axes of the machine tool. For example the working table will be turned around its C axis 4×90° and for every time the position of the calibration ball particularly its center is measured by a touch probe installed on the machine head (respectively on the machine spindle). The off-center position (positioning error) for every measured position is memorized in a map of positioning errors. The same position measurements of the calibration ball and memorization of the measured positioning errors are subsequently repeated for another rotation axis, for example the A or the B axis of the machine tool.

The inventive calibration method uses then a kinematic model of the machine tool to determine the kinematic errors using an optimization algorithm [4], which is based on the generated position error map and combines therewith the positioning errors measured on at least two different rotation axes. The generated compensation model quantifies the different errors within the kinematic chain based on the conducted measurements on different linear and rotation axes, deriving the corresponding compensations for the positioning of the working table in respect of the main spindle in the machining head for the machining operations. The inventive kinematic calibration method considers in contrast to known calibrations the global behaviour (over all measured rotating axes) of the machine tool, even though standard measurement systems are used. The calibration procedure takes arbitrary measuring positions into account and calculates therefrom optimal compensation values for the occurring translational and rotational position errors for all translational and rotational movements of the workpiece table in relation to the machine head/main spindle. Also the rotational position errors can be compensated directly on the rotational axis itself, if it is available.

Known solutions calculate the kinematic errors of one single rotation axis at a time by considering only subsets of positioning errors, which might lead to less accurate compensation. Other concurrent systems compensate only the tool center point position without taking into account the physical kinematic errors. Such methods require extensive measurements in order to cover the whole range of positioning conditions of the machine and are thus much less convenient.

The advantages of the proposed calibration procedure are an accurate identification of the kinematic errors of the rotation axes of a machine tool by considering the positioning errors of all rotation axes together as well as a fast measurement process possible due to the need of a minimum different axis positions to investigate coming from the fact that a physical kinematic model of the machine is considered. Moreover, the required material for the calibration remains affordable and convenient for a standard shop floor environment as the procedure requires only a calibration ball mounted on the table or a pallet and a standard touch probe.

Homogeneous transformation matrices are used to mathematically describe the kinematics of the machine. This is a standard method especially used in robotics and known state of the art (see [3]).

The homogeneous transformation matrix T is used to compute the displacement (translation and/or rotation) of an arbitrary position defined by the Cartesian coordinates x, y and z in a position vector q to another position vector q':

$$q' = T \cdot q \text{ with } q = [xyz1]^T$$

For instance, a rotation around the X axis of an angle θ before applying a translations along X, Y and Z axes of dx, dy and dz, respectively is expressed by the transformation matrix T such that $$T = Trans(X, dx) \cdot Trans(Y, dy) \cdot Trans(Z, dz) \cdot Rot(X, \theta)$$

$$T = \begin{bmatrix} 1 & 0 & 0 & dx \\ 0 & \cos\theta & -\sin\theta & dy \\ 0 & \sin\theta & \cos\theta & dz \\ 0 & 0 & 0 & 1 \end{bmatrix}$$

Considering the example of machine kinematics in FIG. 1, the kinematic model from the machine base to the workpiece with the kinematic errors of both rotational axes can be expressed by $$_{WP}^{F}T =\ _{X}^{F}T \cdot Trans(X,X0B) \cdot Trans(Z,Z0B) \cdot Rot(X,A0B)$$
$$\cdot Rot(Z,C0B) \cdot _{B}^{X}T(B+B0C) \cdot Trans(X,X0C) \cdot Trans(Y,Y0C) \cdot Rot(X,A0C) \cdot _{C}^{B}T \cdot _{WP}^{C}T$$

A detailed mathematical description of the kinematic model can be found in the indicated literature [3].

DRAWINGS

The invention and its application will be described in the following with reference to attached figures. The figures enclosed to this specification show.

DETAILED DESCRIPTION

FIG. 1 shows a typical multi-axis machine tool 1 with three linear axes X, Y and Z and two rotational axes B and C. The working table 2 can be moved linearly along the axis X. The linear movements along the Y and Z axis are on the other hand conducted by the machining head 3. The working table 2 can be rotated around the rotation axis C and B. A further rotational axis A could be implemented in the machine tool 1, for instance by the foreseeing possibility to tilt the machine head 3 around the X axis (see arrow A).

Figure 2:
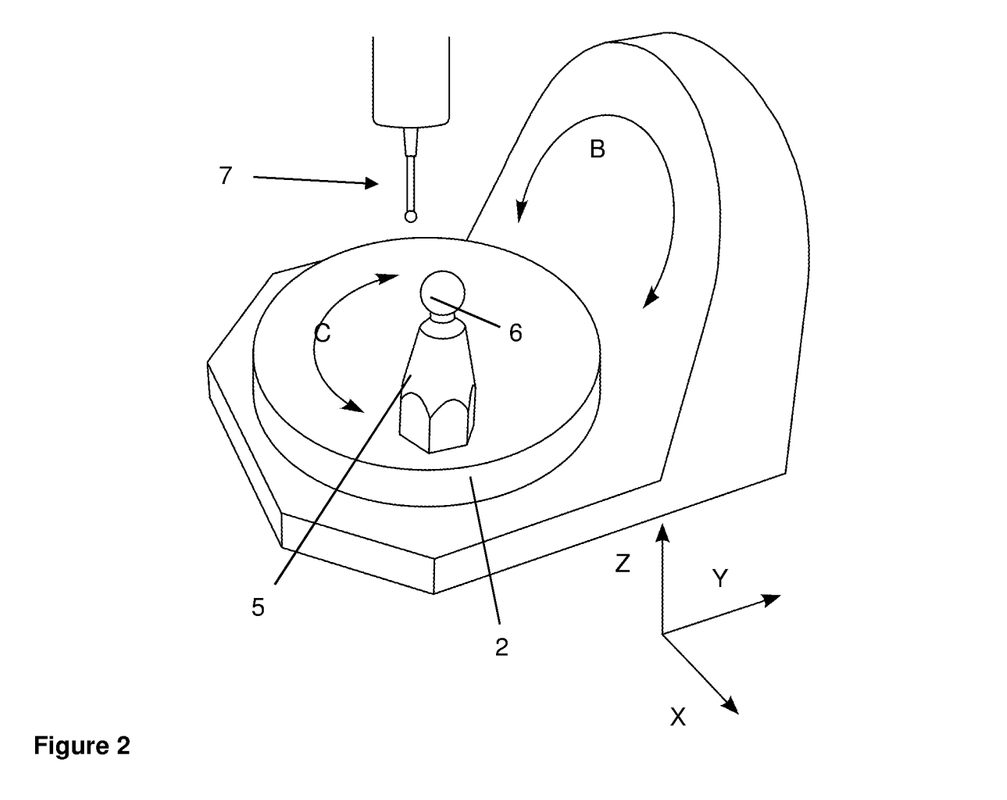

FIG. 2 shows the working table 2 already displayed in FIG. 1 on which a jig 5 is mounted with a calibration ball 6 on its top. The position of the calibration ball 6 particularly of its center is measured by a touch probe 7 mounted on the machine head 3 of the machine tool 1.

Figure 3:
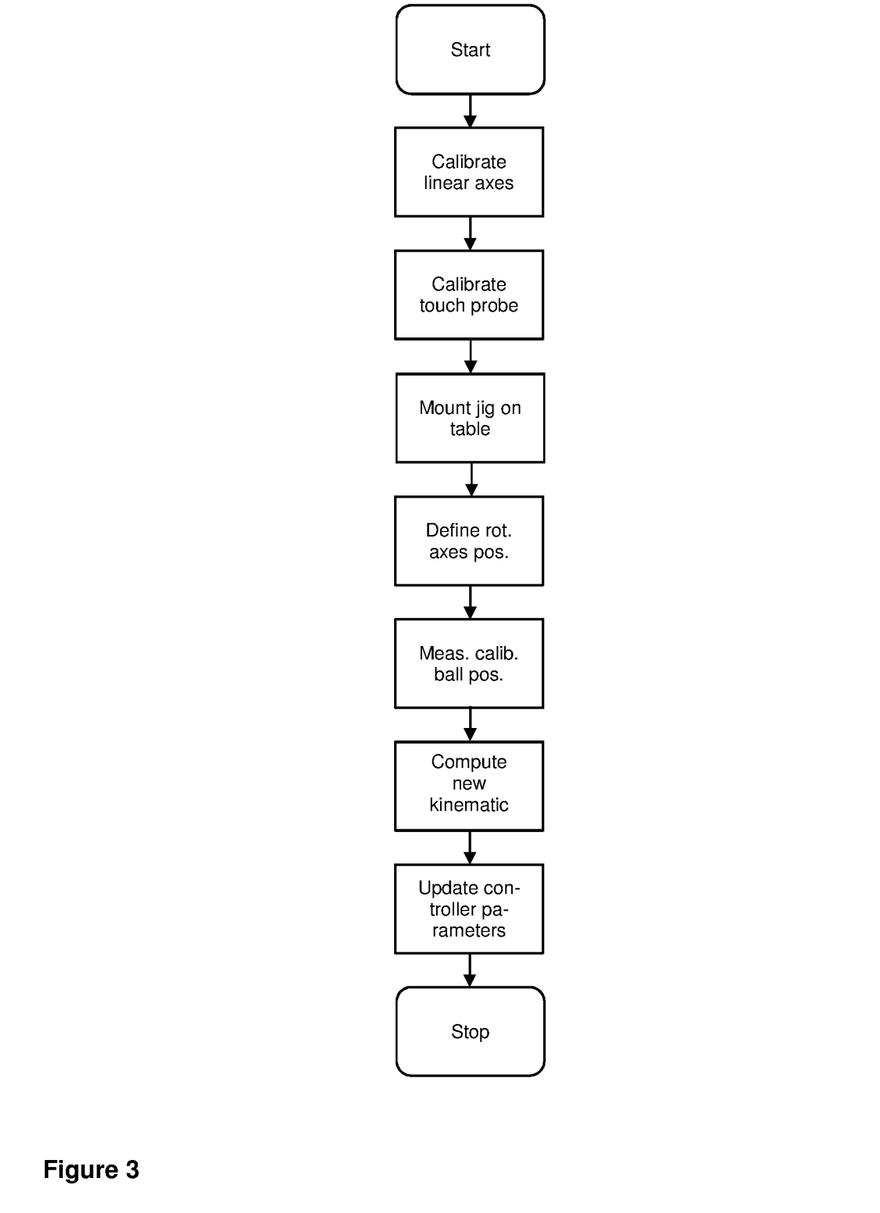
Figure 6:
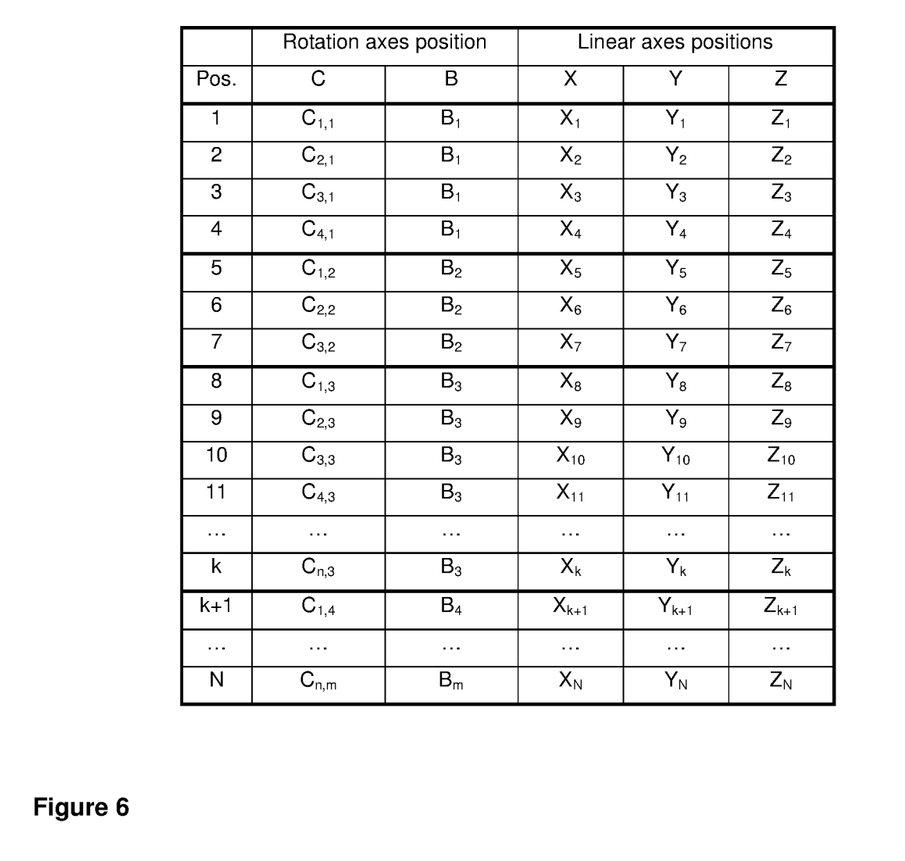

In the following, the inventive calibration method will be described based on an example. FIG. 3 presents the whole proposed calibration procedure. Before starting the kinematic calibration of the rotation axes C and B of the machine tool 1 (see foregoing FIGS. 1 and 2), the linear axes X, Y and Z as well as the touch probe 7 of the machine tool 1 must be properly calibrated. That calibration is conducted according to the state of the art. Once the jig 5 with the calibration ball 6 is mounted on the working table 2, the positions of the rotation axes to investigate are predefined (for example as illustrated in the coming FIG. 6, the positions of the C and of the B axes, $C_i$ and $B_j$ with i=1,j, 2,j, 3,j . . . n,j and j=1, 2 . . . m). Subsequently, the measurement of the calibration ball 6 in the different predefined rotational axis positions is executed and the new kinematic model is computed based on the measured positions of the calibration ball. The machine controller of the machine tool is subsequently updated with the determined kinematic model to compensate the actual positioning errors occurring with movement of the machine axes. More explanations regarding the measurement of the calibration ball in the predefined rotational axis positions are given in consideration of the next FIG. 4.

Figure 4:
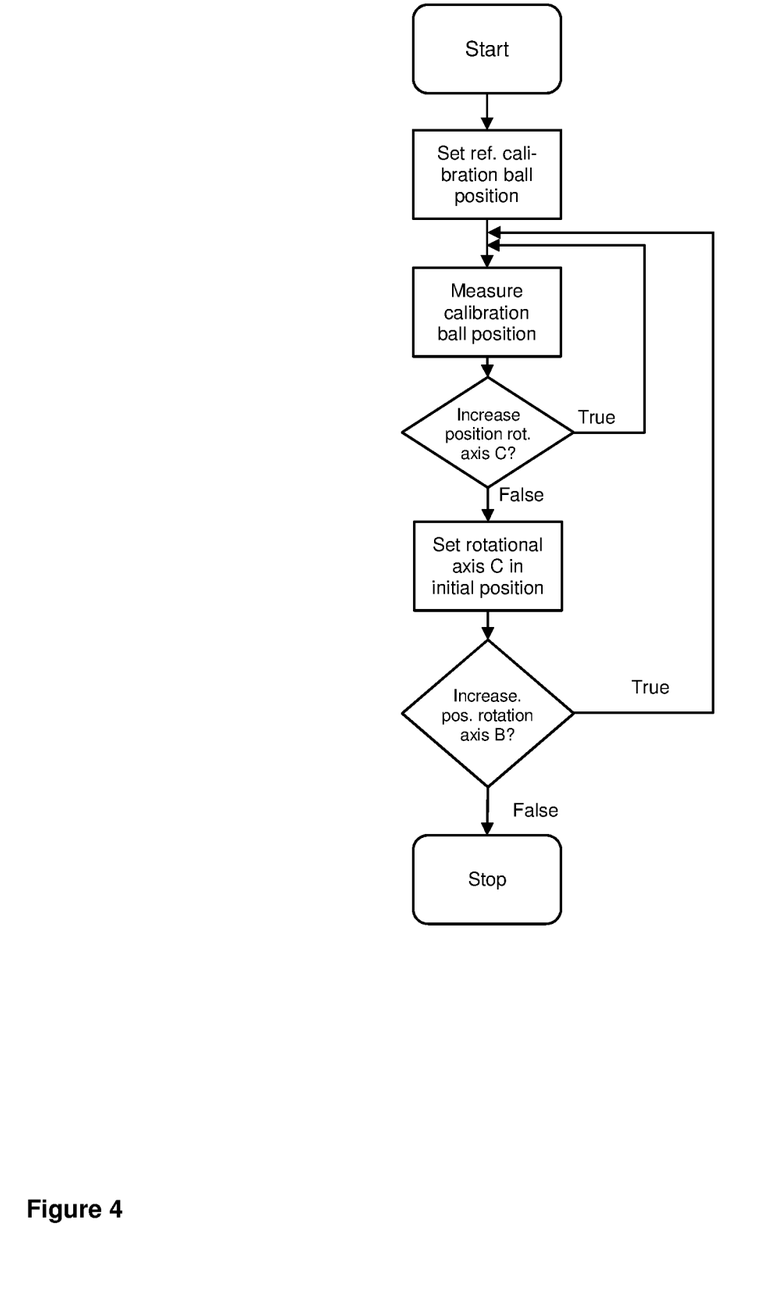

FIG. 4 shows that after setting and measuring the reference position of the jig 5 and the calibration ball 6 with the rotation axes in zero position, i.e., corresponding to the condition where the linear axes of the machine have been initially calibrated, the position of the calibration ball 6 around a first rotation axis, e.g., the rotation axis C, is increased by a (partial) turn of the calibration ball 6 around that first rotation axis (for example, from $C_{1,1}$ to $C_{2,1}$ position). After that turn, the position of the calibration ball 6 respectively of its center is measured. The center position of the calibration ball 6 is determined through typically five contact measurements by the touch probe 7 at different locations around the periphery of the calibration ball 6. The measurement of the calibration ball's center is repeated for all the predefined positions around the first rotation axis, e.g., the rotation axis C. Then the calibration ball 6 is (partially) turned around a second rotation axis, e.g., the rotation axis B (for example, from $B_1$ to $B_2$ position) and the center of the calibration ball is measured again for all or a subset of the first rotation axis positions. For each measurement, the position of the calibration ball's 6 center $X_k$, $Y_k$, $Z_k$, (with k=1, 2 . . . N, wherein N is the total number of different calibration ball position measurements) according to the three linear axes X, Y and Z are reported—for example—into a table (see table in FIG. 6 including the measured positions 1, 2, 3 . . . . N of the calibration ball's center 6 at the predefined rotation and linear axes positions).

In contrast to all known calibration methods, the measurement of the positions of the calibration ball's center is done with the inventive calibration method by an incremental and combined turning of the calibration ball around two rotation axes (e.g., B and C). The measurements around a first axis will consequently be repeated after an incremental change of the position of the calibration ball around the second axis. Subsequently, the position of the calibration ball around the second axis is changed again and the measurements around the first axis will be repeated, etc. The sequence of the measured positions is consequently different to the known measurement methods. Example: The measurement sequence according to the inventive method is:

Position($C_{1,1}$;$B_1$)→Position($C_{2,1}$;$B_1$)→Position($C_{3,1}$; $B_1$)→ . . . →Position($C_{n,1}$;$B_1$)→

Position($C_{1,2}$;$B_2$)→Position($C_{2,2}$;$B_2$)→Position($C_{3,2}$; $B_2$)→ . . . →Position($C_{n,2}$;$B_2$)→

Position($C_{1,3}$;$B_3$)→Position($C_{2,3}$;$B_3$)→Position($C_{3,3}$; $B_3$)→ . . . →Position($C_{n,3}$;$B_3$)→

. . .

Position($C_{1,m}$;$B_m$)→Position($C_{2,m}$;$B_m$)→Position($C_{3,m}$;$B_m$)→ . . . →Position($C_{n,m}$;$B_m$).

This example constitutes the general case where for all different positions of the second axis position $B_1$, $B_2$ . . . $B_m$, a different number and even different angles are used for the first rotational axis.

In comparison the measurement sequence according to the state of the art:

Position($C_1$;$B_1$)→Position($C_2$;$B_1$)→Position($C_3$; $B_1$)→ . . . →Position($C_n$;$B_1$)→

Position($C_1$;$B_1$)→Position($C_1$;$B_2$)→Position($C_1$; $B_3$)→ . . . →Position($C_1$;$B_m$).

The measurement sequences of the state of the art do not combine the rotation around two axes. With those methods the kinematic error of each axis (e.g., axis C is measured independently of the other axis (e.g., axis B).

In contrast to the state of the art, the measurement sequences of the inventive method combine the movement of two—or eventually even more—axes (e.g., C and B). By this, the kinematic error of combined axial movements will be measured and evaluated. The resulting set of measured positions of the calibration ball (e.g., represented by a table according to FIG. 6) is used to compute the kinematic model. Using the inventive measurement method sequence, results in a substantially more accurate kinematic model.

Figure 5:
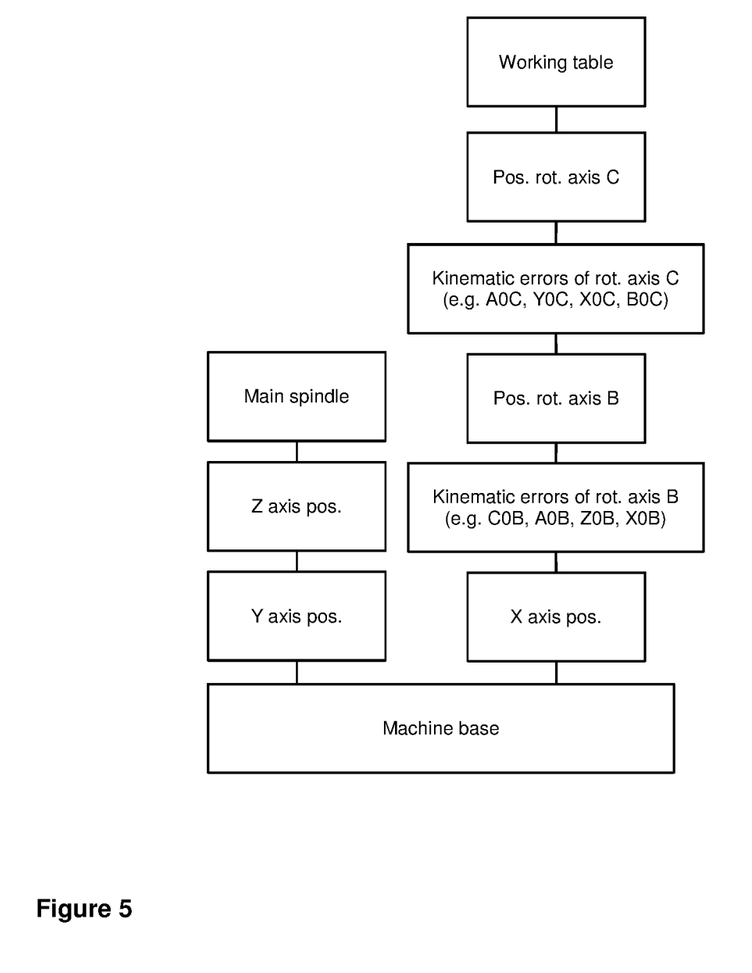

Based on the exact location of the calibration ball 6 measured for all selected positions around the first and second rotation axes (e.g., C and B), the occurred kinematic errors of the rotation axes of the machine tool are retrieved using a physical model of the machine kinematics to compute the kinematic model. This kinematic model considers the whole kinematic chain between the machining tool clamped in the machine head 3 and the part clamped on the working table 2, as the example in FIG. 5 illustrates. The kinematic model is mathematically represented using homogeneous transformation matrices (see literature [3]). A standard optimization method, for instance nonlinear least-squares curve fitting (read literature [4]), is used to calculate the different kinematic errors related to the rotation axes (for example the values A0C, B0C, X0C, Y0C, A0B, C0B, X0B, Z0B in FIG. 5) best fitting the effectively measured positions X, Y and Z coordinates of the calibration ball center listed in table of FIG. 6. Finally, to compensate the positioning errors of the machine tool, the parameters of the numerical controller are updated with the obtained kinematic errors calculated with the kinematic model.

As described above, the inventive calibration method is intended for a numerical controlled machine tool, wherein the numerical controlled machine tool comprises a working table and a machine head with a main spindle. The numerical controlled machine tool further comprises at least 3 linear axes (directions X, Y, Z) and at least 2 rotation axes, eventually 3 rotation axes, by which the main spindle and the working table can be moved relatively to each other. To execute the new calibration method, it is necessary that the numerical controlled machine tool is equipped with a jig, having a calibration ball. The jig with the calibration ball is mounted on the working table, while the main spindle of the machine head needs to be equipped with a touch probe. The inventive calibration method includes the step of measuring the position of the calibration ball by conducting with the touch probe at least four, preferably five, contact measurements with the mounted touch probe, wherein the position of the calibration ball is changed at least three times by rotating the working table or the machine head around the rotation axes (A, B, C) and the step of measuring the position of the calibration ball is repeated for every position change of the calibration ball.

The calibration method uses a kinematic model which calculates from the at least three measured positions of the calibration ball the kinematic errors of the numerical controlled machine tool to compensate the positioning error of the working table movements in respect of the main spindle.

The kinematic model uses the position errors of the calibration ball in respect of the calibration ball's theoretically correct position to generate a compensation model for the numerical controlled machine tool to compensate the positioning error of the working table movements in respect of the main spindle.

The inventive calibration method measures the positions of the calibration ball with a measurement sequence which includes the combined movement of the calibration ball around two, preferably three, rotation axes, wherein the measurements around a first rotation axis include at least two, preferably m, rotational position movements around a second axis.

According to the inventive calibration method, the measurement sequence for the rotational positions ($C_i$; $B_j$) of the calibration ball (6) can be as follows:

$(C_1; B_1), (C_2; B_1), (C_3; B_1) \ldots (C_n; B_1)$ $(C_1; B_2), (C_2; B_2), (C_3; B_2) \ldots (C_n; B_2)$ $(C_1; B_3), (C_2; B_3), (C_3; B_3) \ldots (C_n; B_3)$

...

$(C_1; B_m), (C_2; B_m), (C_3; B_m) \ldots (C_n; B_m)$ or $(C_{1,1}; B_1), (C_{2,1}; B_1), (C_{3,1}; B_1) \ldots (C_{n,1}; B_1)$ $(C_{1,2}; B_2), (C_{2,2}; B_2), (C_{3,2}; B_2) \ldots (C_{n,2}; B_2)$ $(C_{1,3}; B_3), (C_{2,3}; B_3), (C_{3,3}; B_3) \ldots (C_{n,3}; B_3)$

...

$(C_{1,m}; B_m), (C_{2,m}; B_m), (C_{3,m}; B_m) \ldots (C_{n,m}; B_m)$.

Preferably, the inventive calibration method for a numerical controlled machine tool describes the relative movements between the working table and the main spindle with a kinematic model using homogeneous transformation matrices for considering the kinematic errors of the rotation axes (e.g., A, B, C).

The position of the calibration ball can be measured in the coordinates of the linear axes X, Y and Z, wherein each measured calibration ball position (e.g., Xk, Yk, Zk) is memorized in a position table.

Further, the touch probe can be mounted in the main spindle as a trigger-based contact measurement device, transmitting its trigger signal to the numerical controlled machine tool through wireless transmission. Preferably, the touch probe can also be used to determine the reference position of a part to be machined.

The kinematic model of the calibration method can for instance calculate the kinematic error occurring by the movement of the rotation axes (e.g., A, B, C) based on the linear axis positions (e.g., Xk, Yk, Zk) memorized in the position table.

The compensation model generated by the kinematic model includes an optimization algorithm for compensating the kinematic errors occurring with a relative movement between the working table and the main spindle.

When the measurement sequence includes the combined movement of the calibration ball around two rotation axes (e.g., C, B or C, A), the kinematic model considers eight compensation parameters characterizing the kinematic errors of the rotation axes (e.g., A0C, B0C, X0C, Y0C, A0B, C0B, X0B, Z0B or A0C, B0C, X0C, Y0C, B0A, C0A, Y0A, Z0A, respectively).

The kinematic model can use the position errors of the calibration ball in respect of the calibration ball's theoretically correct position to generate a compensation model for the numerical controlled machine tool to compensate the positioning error of the working table movements in respect of the main spindle.

The kinematic model generates preferably a compensation model calculated by a processing unit located outside the numerical controlled machine tool. The compensation model is transmitted for instance by communication means, e.g., via telecommunication means, to the numerical control system of the numerical controlled machine tool.

The calibration method is applied for instance by the machine control unit of the numerical controlled machine tool.

The invention includes the possibility that the kinematic model generating a compensation model is calculated by a processing unit located outside the numerical controlled machine tool. In such a case, the calculated compensation model can be transmitted from the processing unit via telecommunication means—most preferably via internet or telephone connection—to the numerical controlled machine tool.

The present invention is not limited to the explicitly explained examples and embodiments. The illustrated alternatives are rather to be considered suggestions intended to motivate the person skilled in the art to implement the invention in a most favorable way.

LITERATURE

[1] S. Weikert, R-Test, a New Device for Accuracy Measurements on Five Axis Machine Tools, CIRP Annals—Manufacturing Technology, 53/1, 2004, pages 429-432
[2] Touch probe cycle 451 in Heidenhain Benutzer-Handbuch Zyklenprogrammierung iTNC530, 2010
[3] T. Bajd et al., Chapter 2 in Robotics, Springer, 2010
[4] D. M. Bates and D. G. Watts, Nonlinear Regression and its Applications, New York, Wiley, 1988

What is claimed is:

1. A calibration method for a numerical controlled machine tool, wherein the numerical controlled machine tool comprises a working table and a machine head with a main spindle, the numerical controlled machine tool further comprises at least 3 linear axes (X, Y, Z) and at least 2 rotation axes (A, B, C) by which the main spindle and the working table can be moved relatively to each other, the numerical controlled machine tool having a jig with a calibration ball mounted on the working table and the main spindle having mounted a touch probe, wherein the calibration method includes the step to measure the position of the calibration ball by conducting with the touch probe at least 4 contact measurements with the mounted touch probe, wherein the position of the calibration ball is changed at least three times by rotating the working table or the machine head around the rotation axes (A, B, C) and the step of measuring the position of the calibration ball is repeated for every position change of the calibration ball, and wherein the calibration method uses a kinematic model for generating from the at least three measured positions of the calibration ball a compensation model to compensate the kinematic errors occurring with a relative movement between the working table and the main spindle, wherein the calibration method measures the positions of the calibration ball with a measurement sequence which includes the combined movement of the calibration ball around at least two rotation axes (A, C, B), wherein the measurements around a first rotation axis (C, B, A) include at least two rotational position movements around a second axis (B, A, C);

wherein the position of the calibration ball is measured in the coordinates of the linear axes X, Y and Z, wherein each measured calibration ball position $(X_k, Y_k, Z_k)$ is memorized in a position table; and wherein the kinematic model of the calibration method calculates the kinematic error occurring by the movement of the rotation axes (A, B, C) based on the linear axis positions $(X_k, Y_k, Z_k)$ memorized in the position table.

2. The calibration method for a numerical controlled machine tool according to claim 1, wherein the measurement sequence for the rotational positions $(C_i; B_i)$ of the calibration ball is $(C_1; B_1), (C_2; B_1), (C_3; B_1) \ldots (C_n; B_1)$ $(C_1; B_2), (C_2; B_2), (C_3; B_2) \ldots (C_n; B_2)$ $(C_1; B_3), (C_2; B_3), (C_3; B_3) \ldots (C_n; B_3)$

...

$(C_1; B_m), (C_2; B_m), (C_3; B_m) \ldots (C_n; B_m)$ or $(C_{1,1}; B_1), (C_{2,1}; B_1), (C_{3,1}; B_1) \ldots (C_{n,1}; B_1)$ $(C_{1,2}; B_2), (C_{2,2}; B_2), (C_{3,2}; B_2) \ldots (C_{n,2}; B_2)$ $(C_{1,3}; B_3), (C_{2,3}; B_3), (C_{3,3}; B_3) \ldots (C_{n,3}; B_3)$

...

$(C_{1,m}; B_m), (C_{2,m}; B_m), (C_{3,m}; B_m) \ldots (C_{n,m}; B_m)$.

3. The calibration method for a numerical controlled machine tool according to claim 1, wherein to describe the relative movements between the working table and the main spindle the kinematic model uses homogeneous transformation matrices for considering the kinematic errors of the rotation axes (A, B, C).

4. The calibration method for a numerical controlled machine tool according to claim 1, wherein the touch probe is mounted in the main spindle and is a trigger-based contact measurement device transmitting its trigger signal to the numerical controlled machine tool through wireless transmission, wherein the touch probe is also used to determine the position of a part to be machined.

5. The calibration method for a numerical controlled machine tool according to claim 1, wherein the compensation model generated by the kinematic model includes an optimization algorithm for compensating the kinematic errors occurring with a relative movement between the working table and the main spindle.

6. The calibration method for a numerical controlled machine tool according to claim 1, wherein when the measurement sequence includes the combined movement of the calibration ball around two rotation axes (C, B, A), the kinematic model considers 8 compensation parameters characterizing the kinematic errors of the rotation axes (A0C, B0C, X0C, Y0C, A0B, C0B, X0B, Z0B or A0C, B0C, X0C, Y0C, B0A, C0A, Y0A, Z0A, respectively).

7. The calibration method for a numerical controlled machine tool according to claim 1, wherein the kinematic model uses the position errors of the calibration ball in respect of the calibration ball's theoretically correct position to generate a compensation model for the numerical controlled machine tool to compensate the positioning error of the working table movements in respect of the main spindle.

8. The calibration method for a numerical controlled machine tool according to claim 1, wherein the kinematic model generating a compensation model is calculated by a processing unit located outside the numerical controlled machine tool and wherein the compensation model is transmitted to the numerical control system of the numerical controlled machine tool.

9. A numerical controlled machine tool using a calibration method according to claim 1, wherein the calibration method is applied by the machine control unit of the numerical controlled machine tool.

10. The numerical controlled machine tool according to claim 1, wherein the kinematic model generating a compensation model is calculated by a processing unit located outside the numerical controlled machine tool, the calculated compensation model being transmitted from the processing unit to the numerical controlled machine tool.

* * * * *